H. R. KENNEDY.
METAL WORKING TOOL.
APPLICATION FILED NOV. 15, 1921.
Reissued Jan. 17, 1922. 15,268.
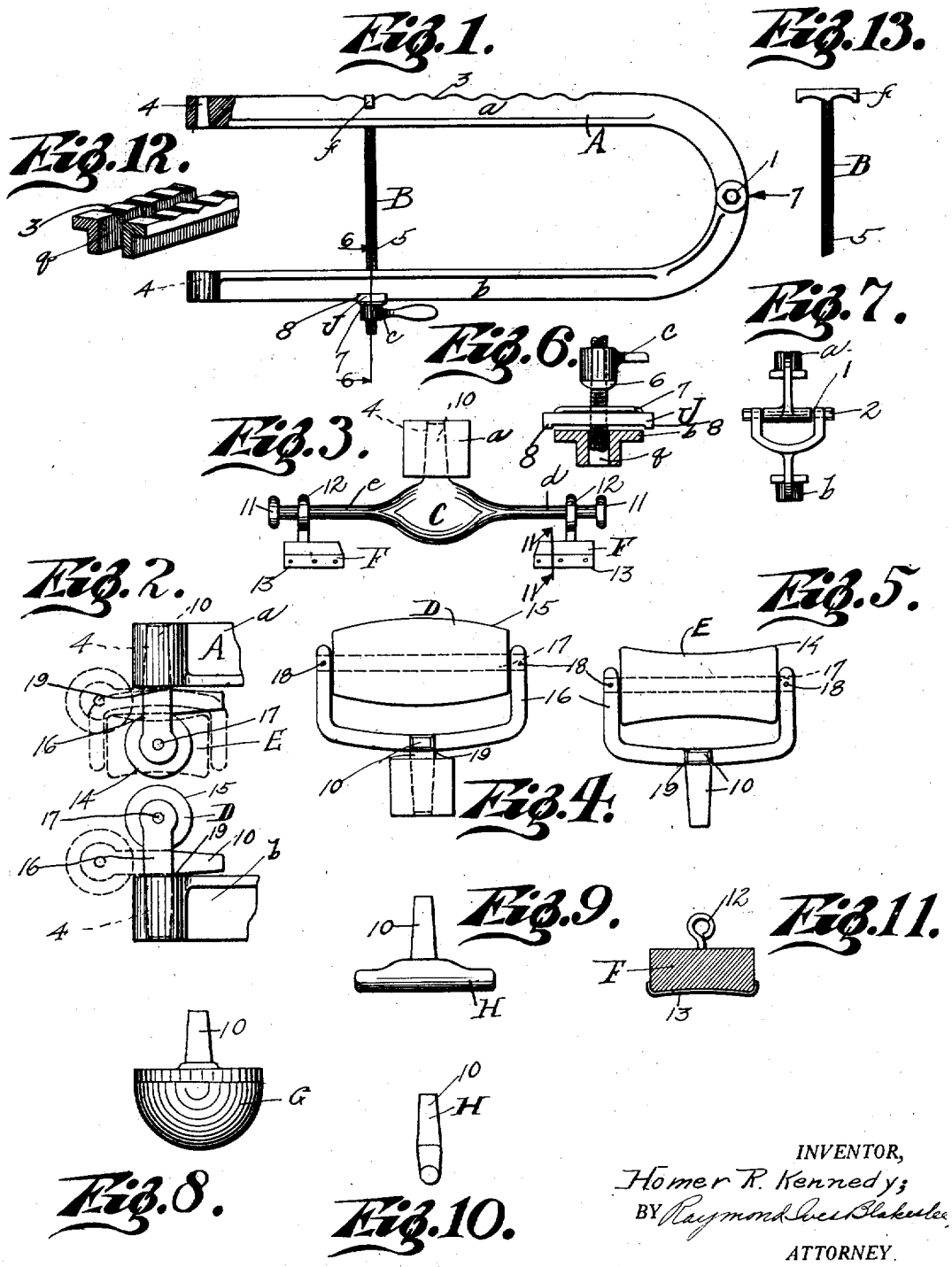
INVENTOR,
Homer R. Kennedy;
BY Raymond Lee Blakeslee
ATTORNEY.

UNITED STATES PATENT OFFICE.

HOMER R. KENNEDY, OF LOS ANGELES, CALIFORNIA, ASSIGNOR, BY MESNE ASSIGNMENTS, TO JOSEPH J. MATHE AND STANLEY O. WOOD, BOTH OF LOS ANGELES, CALIFORNIA.

METAL-WORKING TOOL.

15,268. Specification of Reissued Letters Patent. Reissued Jan. 17, 1922.

Original No. 1,316,451, dated September 16, 1919, Serial No. 286,192, filed March 29, 1919. Application for reissue filed November 15, 1921. Serial No. 515,381.

*To all whom it may concern:*

Be it known that I, HOMER R. KENNEDY, a citizen of the United States, residing at Los Angeles, in the county of Los Angeles and State of California, have invented new and useful Improvements in Metal-Working Tools, of which the following is a specification.

This invention relates to metal-working tools, and particularly to tools for removing bumps or indentations in fenders, door panels, tonneau, cowls, etc., without injury to the enamel of said members.

At the present time whenever a fender or other metal part of an automobile is damaged through any cause said part is usually straightened by a process known in the art as hand-peening. This process consists of placing a template or some form of stake-head under the damaged surface of the sheet metal, and pounding upon the top surface with a hammer. As will be readily understood, pounding chips and cracks the enamel, and while the surface may be entirely smooth when the job is finished, yet hand-peening is at best a long and laborious task. Usually when a fender, or other sheet metal part of an automobile is damaged, as for instance, a fender, door, etc., the said part is removed from the automobile, and the work done in a shop, with the consequent result of delay and resulting expense to the customer. The method of removing bumps or indentations to be described consists of a simple arrangement of members and parts whereby the necessity of hand-peening is eliminated, and any indentation may be removed from the metal within a minimum of time and effort, with the said part restored to its original form.

With the above and other objects in view, the invention consists in the novel and useful provision, combination, formation, association and interrelation of parts, members and features, all as hereinafter described, shown in the drawing, and finally pointed out in the claims.

Fig. 1 is a side elevation of the frame and certain features of a sheet metal-working tool or device constructed in accordance with my invention and adapted to be utilized, as for example, in the manner shown in Fig. 2, for shaping elements in other figures of the drawing:

Fig. 2 is an enlarged view of fragments of the frame shown in Fig. 1 showing shaping elements applied thereto.

Fig. 3 is an elevation of a pressure bar member carrying rocking feet, which member is used in practicing one embodiment of the invention;

Figs. 4 and 5 illustrate shaping elements;

Fig. 6 is a fragmentary view, certain parts being in section, of the tongs, showing the T-headed pressure bolt which is used for moving the tong arms toward each other, such view being taken on the line 6—6 of Fig. 1;

Fig. 7 is a view looking in the direction of the arrow 7 at the righ-hand side of Fig. 1, showing the hinged connection of the frame members of the metal-working tool;

Fig. 8 is an end view of a stake-head or metal shaping element;

Figs. 9 and 10 are side and end views of another form of stake-head;

Fig. 11 is a cross sectional view of one of the pressure feet shown in Fig. 3, and taken on the line 11—11 of Fig. 3, and looking in the direction of the appended arrows;

Fig. 12 is a fragmentary, perspective and partly cross sectional view of one of the arms of the metal-working tool shown in Fig. 1; and, Fig. 13 is a fragmentary view of the T-headed pressure bolt shown in Fig. 1.

Corresponding parts in all the figures are designated by the same reference characters.

Referring now with particularity to the drawing:

A designates the frame or tongs member, B the pressure or clamping bolt, C the pressure bar, D and E forming or shaping elements, F pressure feet, which may be utilized with the pressure bar C, G and H stake-heads, and J a sleeper iron washer, all of which elements may be utilized in practising one embodiment of the invention.

The tongs or frame A includes two arm members *a* and *b* hinged together, as at 1. This hinged connection is best illustrated in Fig. 7, in which it will be seen that the arm member *b* is provided with a forked or bifurcated extremity, while one extremity of the arm member *a* is received between said bifurcations. A bolt member 2 passes through openings in the bifurcated member, and through an opening in the member *a*, so that the member *a* may be securely held to the member *b*. In Fig. 1 the ends of the arms *a* and *b* where they join in a hinged connection are shown as curved; however, I do not wish to confine myself to the particular shape of tongs illustrated, as many other shapes might be utilized. The free ends of both arms *a* and *b* are enlarged and provided with transverse openings 4, and these openings are adapted to receive parts of various forming members to be described. The top surface of the arm *a* is serrated, as shown at 3, and both arms *a* and *b* are longitudinally slotted, as shown at *q* in Figs. 6 and 12. The pressure bolt B is provided at one end with a flanged T-head *f*, and the other end thereof is screw threaded, as shown at 5. The pressure bolt B is adapted to extend between the arms *a* and *b* and through the slots thereof, with the flanged T-head *f* of said bolt transversely straddling the top surface of the arm *a*, as shown in Fig. 1. Adapted to screw thread upon threads 5 of the bolt B is a ball-headed tail nut *c*, the ball head being shown at 6, and the ball head 6 is adapted to bear against a surface of a sleeper iron washer J (see Fig. 6). The sleeper iron washer J is provided with a bossed or enlarged portion 7, which is formed with a concavity adapted to receive the ball-headed portion 6 of the tail nut *c*. The ball head 6 is slightly smaller than the concavity in the washer J, so that there may be a rocking motion between the washer and the tail nut. The sleeper iron washer is likewise provided with flanges 8, and is adapted to transversely straddle the arm *b*, with the flanges 8 engaging the sides of the arm *b* to guide movement of said washer J.

In utilizing the invention, stake-heads G or H, forming or roller members D and E, as well as the pressure bar C, with its feet F, are provided. Each of the members just mentioned is provided with stump tenons 10, having converging sides. These tenons 10 are adapted to be received and fit within the openings 4 of the arms *a* and *b* of the tongs or frame A, and said tenons in each case projects from the base of the respective member just mentioned. The openings 4 are tapered so as to confine the tenons, and so that the tenons may be easily forced within the openings and removed therefrom when desired by tapping the members *a* and *b*.

If it were desired to remove a concave indentation contained in the top surface of an automobile fender, one of the forming members shown in Figs. 4, 5, 8 and 9 would have its tenon received within the opening 4 of the arm *b*, and would be used on the under surface of the fender at the indented portion, and the pressure feet F would engage the top surface of the fender on opposite sides of the indentation. Each pressure foot is provided with eyes 12 which are loosely received on the arms or reduced ends *d* and *e* of a pressure bar C. The center portion of the pressure bar is shown as slightly enlarged and provided with a tenon 10 which is received in the opening 4 of the arm *a* of the tongs A. The eyes 12 are loose upon the arms *d* and *e* so that the feet F may be moved along the arms as well as free to have a tilting or rocking movement thereon. Flanged ends 11 on the arms *d* and *e* retain the eye 12 on the pressure bar. The pressure feet F have concave under surfaces, so as to conform in part with the curvature of any member upon which they may rest, as for instance, a fender, and the said concave surface may be covered with some soft material 13, such as rubber, to prevent scratching of the enamel on a fender or other object.

The forming members shown in Figs. 4 and 5, which are rollers, are complemental in formation, one of said rollers, as 14, having a concave surface, while the other roller, 15, is provided with a convex surface. Each member, 14 and 15, is carried by a yoke member 16. The body of each member 14 and 15 is provided with a longitudinal bore and a shaft member 17 carried by each yoke arm passes through said bore so that the members 14 and 15 may rotate. The shaft member may be held to each yoke by means of cotter pins 18 passing through a portion of the yoke and the shaft. Each yoke member likewise is provided as at 19 with two stump tenons 10, at right angles to each other. By providing two stump tenons it is possible to have the axis of the member 14 or 15 either extend outwardly of or rearwardly of the outer end of the said tong arm *a* or *b*.

This arrangement is illustrated in Fig. 2, which shows the two positions of the members D and E.

The stake heads G and H may be used in practicing certain embodiments of my invention, and the said stake heads may be in many forms, adapted for the work to be performed.

In operation, if it is desired to remove an indentation in an automobile fender, the pressure bar C would have its tenon inserted in the opening 4, on one or the other of the arms *a* and *b*. In the opposite opening 4 on the other arm of the tongs, is placed a stake head G or H, or, if desired, one of the members D or E. If we assume, for the present, that the indentation is very deep, we choose the stake head G. The arms *a* and *b* are released so that they may be separated and the flanged head *f* of the pressure bolt B is turned so that said head may slip through the slot in the arm *a*. The arm of the tongs which carries the pressure bar C is then so placed that the feet F carried by said bar rest on the top surface of the fender. The tongs device A is then closed with the stake head G directly under the deepest indentation and the T-head of the pressure bolt B is slipped through the slot *q* of the arm *a* and turned so that said T-head straddles the arm *a* and rests in a depressed portion of the serrations 3. This will help prevent the pressure bolt from slipping during operation of the tongs.

The sleeper iron washer J is now brought into position so that its flanged sides 8 engage opposite sides of the arm *b*. The tail nut *c* is then rotated so as to draw the free end portions of the arms *a* and *b* of the tongs A together. This of course tends to press the indented portion of the metal upwardly by bringing the stake head into a forcible engagement with said indentation. At a given point, the tension on the bolt B is released by unscrewing the tail nut *c*, the T-head of the bolt B is then turned parallel with the slot in the arm *a*, and slipped through the same, the stake head removed from the arm *b*, and a forming member such as shown in Figs. 4 and 5 substituted, whereupon the T-head of the bolt B is again slipped through the slot in the member *a*, and turned so as to engage the arm *a*. The nut *c* is screwed down on the pressure bolt B as the tongs device is manipulated in an up and down direction or upwardly and downwardly oscillated, which movement communicates a rotary motion to the forming member D, or E, that will iron out or bend the indented portion of the metal fender back to approximately its original shape.

A method similar to the above consists in placing the members D and E in the openings 4 of the tongs A. The convex member D is usually placed upon the concave surface of an automobile fender, while the concave member E is placed upon the convex surface of the fender. The arms *a* and *b* are again brought together, as above described, so that the members D and E tend to grip the fender between them. A reciprocal movement back and forth of the tongs A causes the members D and E to simultaneously roll the indentation and remove any unevenness from the fender without injury to the enamel on said fender.

Obviously, many combinations of forming members and stake-heads may be used, depending, as before mentioned, on whether the indentation is in the fender, body, door panel, tonneau or cowl of the automobile. The exact shape of the forming members and the stake-heads, in and of themselves, is not a feature of the invention.

From the foregoing explanation of the uses of the new tool it will be observed that one of the distinguishing features of the present invention is that the manually operable frame is formed between its arms with a relatively large opening which permits it to straddle the metal body and to be shifted in varying directions to promiscuously located damaged areas of the metal body.

While I have hereinbefore specifically described my invention in its several phases only with reference to the particular embodiments thereof which are illustrated in the drawing, it will be understood that the invention is in principle equally applicable to any sheet metal surface used on any vehicle, and further that it can be variously modified in its various details within the scope of the appended claims, without departing from the spirit or sacrificing the advantages thereof.

Having thus disclosed my invention, I claim and desire to secure by Letters Patent:

1. A tool for removing indentations from sheet metal articles, including a manually-operable frame having a relatively-large opening permitting it to straddle the metal body and to be shifted in varying directions to the location of a damaged area, opposing shaping elements carried by the frame respectively on opposite sides of the damaged metal area, and pressure applying means carried by the frame.

2. A tool for removing indentations from sheet metal articles, including a manually-operable frame having opposing arms adapted to carry complemental and interchangeable shaping elements, said frame also being adapted to straddle the said metal body and to be shifted to promiscuously located damaged areas thereof, means for removably attaching the interchangeable shaping elements, and pressure-applying means.

3. A tool for removing indentations from sheet metal articles, including a manually-operable frame, complemental concave and convex shaping rollers fitted to the frame in opposed relation and adapted to be disposed respectively on opposite sides of the damaged part, and pressure applying means.

4. A tool for ironing indented sheet metal articles including a manually operable frame carrying opposing ironing elements shaped to permit of rocking and reciprocal movements over the damaged metal part.

5. A tool for ironing indented sheet metal articles including a manually operable contractible frame adapted to be placed astride the metal body, oppositely disposed ironing elements carried by the frame and shaped to permit of rocking and reciprocal movements over the damaged metal part, and means for placing said frame under adjustable compression.

6. A tool for removing indentations from sheet metal articles, including a manually operable frame formed with pivotally mounted arms which are adapted to span the damaged portion of the sheet metal and are movable toward and away from each other, complemental shaping elements applied to the arms in an opposed relation to each other, and a clamping bolt connecting the arms and adjustable longitudinally into different positions thereon, said clamping bolt providing a means for forcibly swinging the arms toward each other to bring the shaping elements into a proper engagement with the indented portion of the sheet metal article.

In testimony whereof, I have signed my name to this specification in the presence of two subscribing witnesses.

HOMER R. KENNEDY.

Witnesses:

J. CALVIN BROWN,

J. SHUTT.